US009918427B2

(12) United States Patent
Anderson et al.

(10) Patent No.: US 9,918,427 B2
(45) Date of Patent: Mar. 20, 2018

(54) DEPTH CONTROL SYSTEM FOR FRONT PIVOT AND REAR PIVOT GAUGE WHEEL ASSEMBLIES

(71) Applicant: CNH Industrial America LLC, New Holland, PA (US)

(72) Inventors: Brian John Anderson, Yorkville, IL (US); Johnathon R. Dienst, Dekalb, IL (US)

(73) Assignee: CNH Industrial America LLC, New Holland, PA (US)

( * ) Notice: Subject to any disclaimer, the term of this patent is extended or adjusted under 35 U.S.C. 154(b) by 46 days.

(21) Appl. No.: 14/796,814

(22) Filed: Jul. 10, 2015

(65) Prior Publication Data
US 2017/0006757 A1    Jan. 12, 2017

(51) Int. Cl.
*A01C 7/20* (2006.01)
*A01C 5/06* (2006.01)

(52) U.S. Cl.
CPC .............. *A01C 7/203* (2013.01); *A01C 5/064* (2013.01)

(58) Field of Classification Search
CPC ....... A01B 63/008; A01B 63/24; A01B 63/26; A01C 5/064; A01C 7/203
See application file for complete search history.

(56) References Cited

U.S. PATENT DOCUMENTS

| 3,450,074 | A |   | 6/1969 | Gatzke et al. | |
|---|---|---|---|---|---|
| 5,081,942 | A |   | 1/1992 | Clark et al. | |
| 5,595,130 | A | * | 1/1997 | Baugher | A01C 5/06 111/164 |
| 6,148,747 | A | * | 11/2000 | Deckler | A01C 5/06 111/137 |
| 6,321,667 | B1 | * | 11/2001 | Shoup | A01C 5/06 111/137 |
| 6,659,193 | B1 | * | 12/2003 | Best | A01C 7/203 111/69 |
| 6,827,029 | B1 | * | 12/2004 | Wendte | A01C 7/042 111/185 |
| 6,935,253 | B2 |   | 8/2005 | Murray et al. | |
| 6,983,705 | B1 | * | 1/2006 | Gust | A01B 63/166 111/167 |
| 7,159,523 | B2 |   | 1/2007 | Bourgault et al. | |
| 7,191,715 | B2 | * | 3/2007 | Wendte | A01C 5/068 111/136 |
| 7,308,859 | B2 | * | 12/2007 | Wendte | A01C 5/064 111/164 |
| 7,360,494 | B2 |   | 4/2008 | Martin | |

(Continued)

*Primary Examiner* — Alicia Torres
*Assistant Examiner* — Adam J Behrens
(74) *Attorney, Agent, or Firm* — Rebecca L. Henkel; Rickard K. DeMille

(57) ABSTRACT

A depth control system for an agricultural implement includes a single pivot lever. Additionally, the depth control system is mounted to the single pivot lever. Further, the depth control system includes a gauge wheel pivotally coupled to a frame of the agricultural implement. The control system controls a height of the gauge wheel relative to the frame via movement of the single pivot lever while the gauge wheel is coupled to a front pivot gauge wheel assembly. Furthermore, the depth control system is configured to control the height of the gauge wheel relative to the frame via movement of the single pivot lever while the gauge wheel is coupled to a rear pivot gauge wheel assembly.

20 Claims, 8 Drawing Sheets

(56) References Cited

U.S. PATENT DOCUMENTS

| | | | |
|---|---|---|---|
| 7,481,278 B1* | 1/2009 | Pomedli | A01C 5/064 |
| | | | 111/167 |
| 7,946,232 B2* | 5/2011 | Patwardhan | A01C 7/203 |
| | | | 111/135 |
| 8,069,798 B2 | 12/2011 | Martin | |
| 8,186,287 B2* | 5/2012 | Schilling | A01C 7/203 |
| | | | 111/167 |
| 8,387,715 B2 | 3/2013 | Rylander | |
| 8,479,669 B2 | 7/2013 | Shoup | |
| 9,357,692 B2* | 6/2016 | Johnson | A01B 63/008 |
| 2010/0180695 A1* | 7/2010 | Sauder | A01C 7/205 |
| | | | 73/862.045 |
| 2012/0255475 A1 | 10/2012 | Mariman et al. | |
| 2013/0112124 A1 | 5/2013 | Bergen et al. | |
| 2013/0213676 A1 | 8/2013 | Bassett | |
| 2015/0351313 A1* | 12/2015 | Dienst | A01B 49/06 |
| | | | 111/149 |

* cited by examiner

DEPTH CONTROL SYSTEM FOR FRONT PIVOT AND REAR PIVOT GAUGE WHEEL ASSEMBLIES

BACKGROUND

The invention relates generally to agricultural implements, and more specifically, to a depth control system for front pivot and rear pivot gauge wheel assemblies.

Generally, planting implements (e.g., planters) are towed behind a tractor or other work vehicle via a mounting bracket secured to a rigid frame of the implement. These planting implements typically include multiple row units distributed across the width of the implement. Each row unit is configured to deposit seeds at a desired depth beneath the soil surface, thereby establishing rows of planted seeds. For example, each row unit may include an opener assembly having a ground engaging tool or opener (e.g., an opener disc) that forms a seeding path for seed deposition into the soil. In certain configurations, the opener assembly may include a front pivot gauge wheel assembly or a rear pivot gauge wheel assembly to control the penetration depth of the opener. As the implement travels across a field, the opener excavates a furrow (e.g., trench) into the soil, and seeds are deposited into the furrow. In certain row units, the opener assembly is followed by a closing device, such as a set of closing discs or wheels that direct the soil back into the furrow, and/or a packer wheel that packs the soil on top of the deposited seeds.

The front pivot gauge wheel assembly and the rear pivot gauge wheel assembly typically utilize different systems for adjusting the penetration depth of the opener. For example, the front pivot gauge wheel assembly and the rear pivot gauge wheel assembly may include parts that are not interchangeable. As a result, the process of changing a gauge wheel assembly (e.g., from front pivot to rear pivot, or vice-versa) may be complex and/or time consuming, thereby delaying planting operations.

BRIEF DESCRIPTION

In an embodiment, a depth control system for an agricultural implement includes a single pivot lever. Additionally, the depth control system is mounted to the single pivot lever. Further, the depth control system includes a gauge wheel pivotally coupled to a frame of the agricultural implement. The control system controls a height of the gauge wheel relative to the frame via movement of the single pivot lever while the gauge wheel is coupled to a front pivot gauge wheel assembly. Furthermore, the depth control system is configured to control the height of the gauge wheel relative to the frame via movement of the single pivot lever while the gauge wheel is coupled to a rear pivot gauge wheel assembly.

In another embodiment, a system for positioning a gauge wheel of an agricultural implement includes the gauge wheel pivotally coupled to a frame of the agricultural implement. Additionally, the system includes a depth control system mounted on the frame of the agricultural implement. The depth control system includes a single pivot lever and a depth controller. Further, the depth controller includes a rear pivot rocker, a linkage system, or a combination thereof, mounted to the single pivot lever. The rear pivot rocker interacts with a rear pivot gauge wheel assembly to control a first height of the gauge wheel based on a position of the single pivot lever while the gauge wheel is coupled to the rear pivot gauge wheel assembly, and the linkage system interacts with a front pivot gauge wheel assembly to control a second height of the gauge wheel based on the position of the single pivot lever while the gauge wheel is coupled to the front pivot gauge wheel assembly.

In a further embodiment, a depth control system includes a single pivot lever, a rocker coupled to the single pivot lever, and a linkage system coupled to the single pivot lever. The linkage system comprises a linkage system actuator and a linkage system arm. Additionally, the rocker and the linkage system are each removable from the depth control system. Further, the single pivot lever is configured to pivot to control the rocker and the linkage system. The rocker is configured to interact with a rear pivot gauge wheel assembly to control a depth at which an opener disc generates furrows, and the linkage system is configured to interact with a front pivot gauge wheel assembly to control a depth at which the opener disc generates the furrows.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

The embodiments described herein relate to a depth control system for controlling planting depth of an agricultural implement. The penetration depth control system is configured to set a penetration depth of an opener disc of a row unit. Moreover, the penetration depth control system is configured to operate with both a front pivot gauge wheel assembly and a rear pivot gauge wheel assembly. For example, an operator may utilize the penetration depth control system for the front pivot gauge wheel assembly and for the rear pivot gauge wheel assembly, thereby substantially recuding the duration associated with switching between gauge wheel assemblies.

Figure 1:
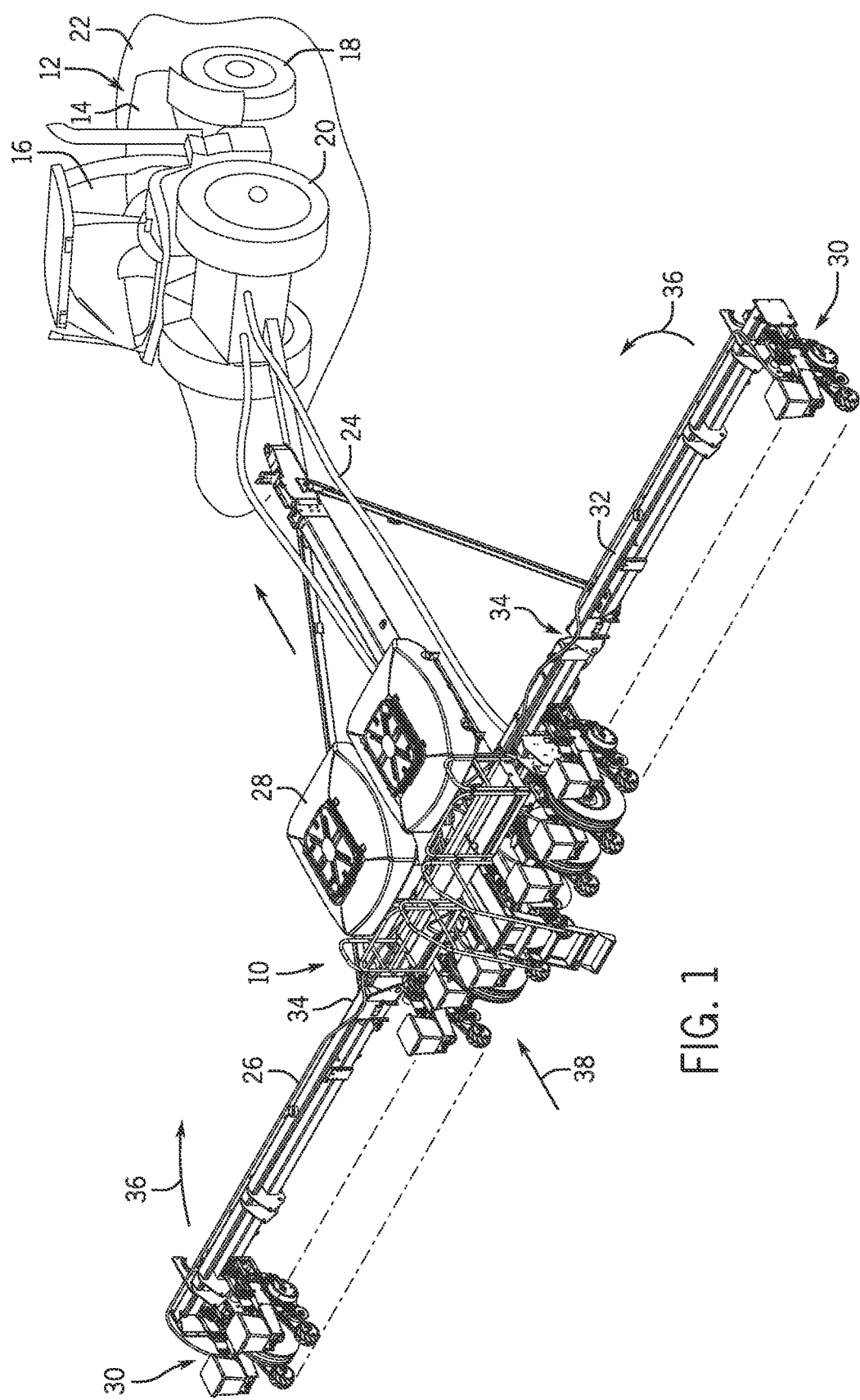
FIG. 1 is a perspective view of an embodiment of an agricultural implement and a work vehicle, which may include a depth control system for front pivot and rear pivot gauge wheel assemblies.

Turning now to the drawings, FIG. 1 is a perspective view of an embodiment of an agricultural implement 10 and a work vehicle 12. The illustrated work vehicle 12 has a body 14 that houses an engine, transmission (e.g., gear box), cooling system, and power train. The work vehicle 12 has a cabin 16 where an operator may sit or stand to operate the vehicle 12. The work vehicle 12 has two front wheels 18 and two rear wheels 20 that rotate to move the work vehicle 12 along the ground 22 at a ground speed. In some embodiments, the work vehicle 12 may have tracks rather than one or both sets of wheels 18, 20.

The agricultural implement 10 is towed behind the work vehicle 12 across the ground 22, as shown in FIG. 1. The work vehicle 12 supplies a working fluid (e.g., hydraulic fluid) to the agricultural implement 10 via one or more fluid lines 24. One or more actuators (e.g., hydraulic motors, hydraulic cylinders, etc.) receive the working fluid from the work vehicle 12 and drive systems of the agricultural implement 10. For example, one or more hydraulic motors may drive a fan and/or seed drive to direct agricultural material (e.g., seeds, fertilizer, etc.) along supply lines 26 from tanks 28 to multiple row units 30 distributed along a frame assembly 32. Each row unit 30 may be configured to deposit seeds at a desired depth beneath the soil surface, thereby establishing rows of planted seeds.

The agricultural implement 10 may have a variety of systems driven by the working fluid (e.g., hydraulic fluid) supplied by the work vehicle 12. For example, motors of the agricultural implement may be driven by the working fluid to facilitate delivery of the agricultural product and/or may establish a vacuum pressure within the tanks 28 and/or the supply lines 26. In some embodiments, the frame assembly 32 of the agricultural implement 10 may be adjustable to fold into a transport configuration (e.g., via rotation of wings about joints 34) as shown by arrows 36 and/or to pivot and align the frame assembly 32 with a direction of travel 38.

Figure 2:
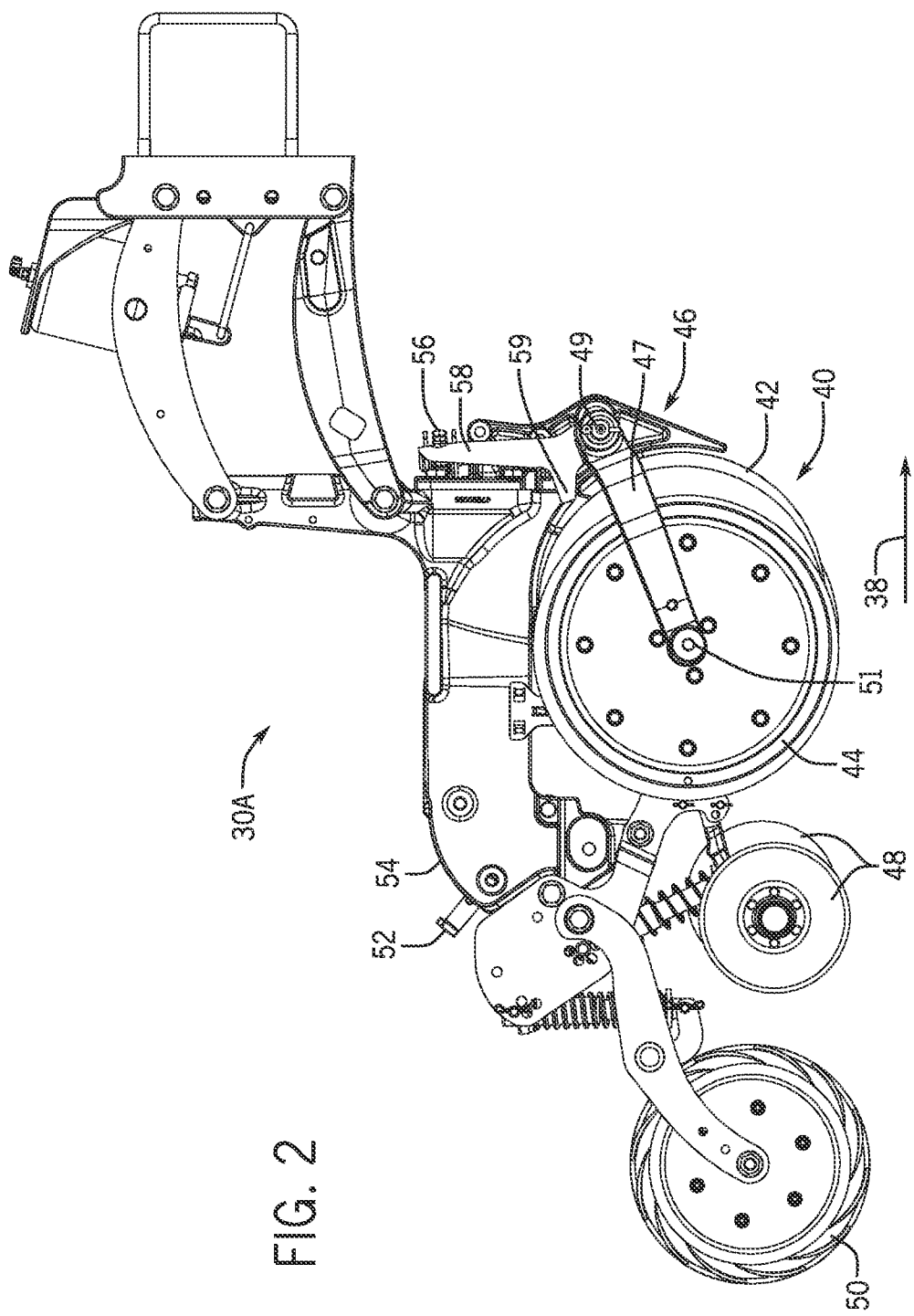
FIG. 2 is a side view of an embodiment of a row unit, which may be mounted to the agricultural implement of FIG. 1, including a front pivot gauge wheel assembly of an opener assembly.

FIG. 2 is a side view of an embodiment of a row unit 30A, which may be mounted to the agricultural implement 10 of FIG. 1, including a front pivot gauge wheel assembly of an opener assembly 40. In the illustrated embodiment, the opener assembly includes two opener discs 42 and two gauge wheels 44. The opener discs 42 penetrate the ground 22 as the row unit 30A travels in a direction 38 across a field to form a furrow for planting seeds. Additionally, each of the gauge wheels 44 may control a depth that the respective opener disc 42 extends into ground 22 (i.e., penetration depth). The penetration depth set by the gauge wheels 44 may be selected by an operator, such that the furrow depth resulting from the opener discs 42 is adjustable. For example, certain seeds may be planted deep into the ground 22 to facilitate enhanced plant growth. Conversely, other seeds may be planted shallow into the ground 22 to facilitate enhanced plant growth.

Additionally, in the illustrated embodiment, the row unit 30A includes a front pivot gauge wheel assembly 46. The front pivot gauge wheel assembly 46 pivotally couples each of the gauge wheels 44 to the row unit 30A. Further, the front pivot gauge wheel assembly 46 provides a mechanism, as discussed below, to adjust the penetration depth of the opener discs 42 into the ground 22. For example, each gauge wheels 44 may move up and down in relation to the row unit frame based on the positioning of a pivot arm 47 of the front pivot gauge wheel assembly 46, thereby facilitating control of the penetration depth of the opener discs 42. Further, the front pivot gauge wheel assembly 46 is configured to pull the gauge wheels 44 as the row unit 30A is pulled by the frame assembly 32 in the direction of travel 38. Accordingly, the front pivot gauge wheel assembly 46 includes a gauge wheel pivot 49 in front of an axis of rotation 51 of the gauge wheels 44.

Once the seeds are deposited in the furrow formed by the opener discs 42, closing discs 48 may redirect removed soil back into the furrow to cover the seeds. As illustrated, the closing discs 48 are rearwardly disposed from the gauge wheels 44 relative to the direction of travel 38. The closing discs 48 are positioned to direct soil back into the furrow to cover the seeds. Furthermore, a packing wheel 50 may follow the closing discs 48 to compact the soil onto the seeds.

Further, to adjust the penetration depth of the opener discs 42, a pivot lever 52 may be moved within a peg system 54 to control a position of the gauge wheels 44 relative to the opener discs 42. While the pivot lever 52 is depicted behind the gauge wheels 44 relative to the direction of travel 38, it may be appreciated that the pivot lever 52 may also be positioned in any other suitable position relative to the gauge wheels 44 with minor variations to the opener assembly 40. As discussed in detail below, adjusting the pivot lever 52 drives a linkage system actuator 56 to move a front pivot actuator 58, which includes a front pivot rocker 59 that interacts with the gauge wheels 44. As the linkage system actuator 56 is pulled rearward relative to the direction of travel 38, the linkage system actuator 56 drives the front pivot actuator 58 to rotate in a first rotational direction, thereby driving the front pivot rocker 59 to rotate in the first rotational direction. In this manner, the front pivot rocker 59 provides a stop to prevent the gauge wheels 44 from moving in an upward direction past a position of the front pivot rocker 59. In preventing the gauge wheels 44 from moving upwardly, the penetration depth of the opener discs 42 is reduced. Similarly, as the linkage system actuator 56 moves forward relative to the direction of travel 38, the linkage system actuator 56 enables the front pivot actuator 58 to rotate in a second rotational direction, thereby enabling the front pivot rocker 59 to rotate in the second rotational direction, which enables the gauge wheels 44 to move upwardly. As the gauge wheels 44 move upwardly, the penetration depth of the opener discs 42 is increased. Accordingly, the opener discs 42 are driven deeper into the ground 22 for forming the furrow.

Figure 3:
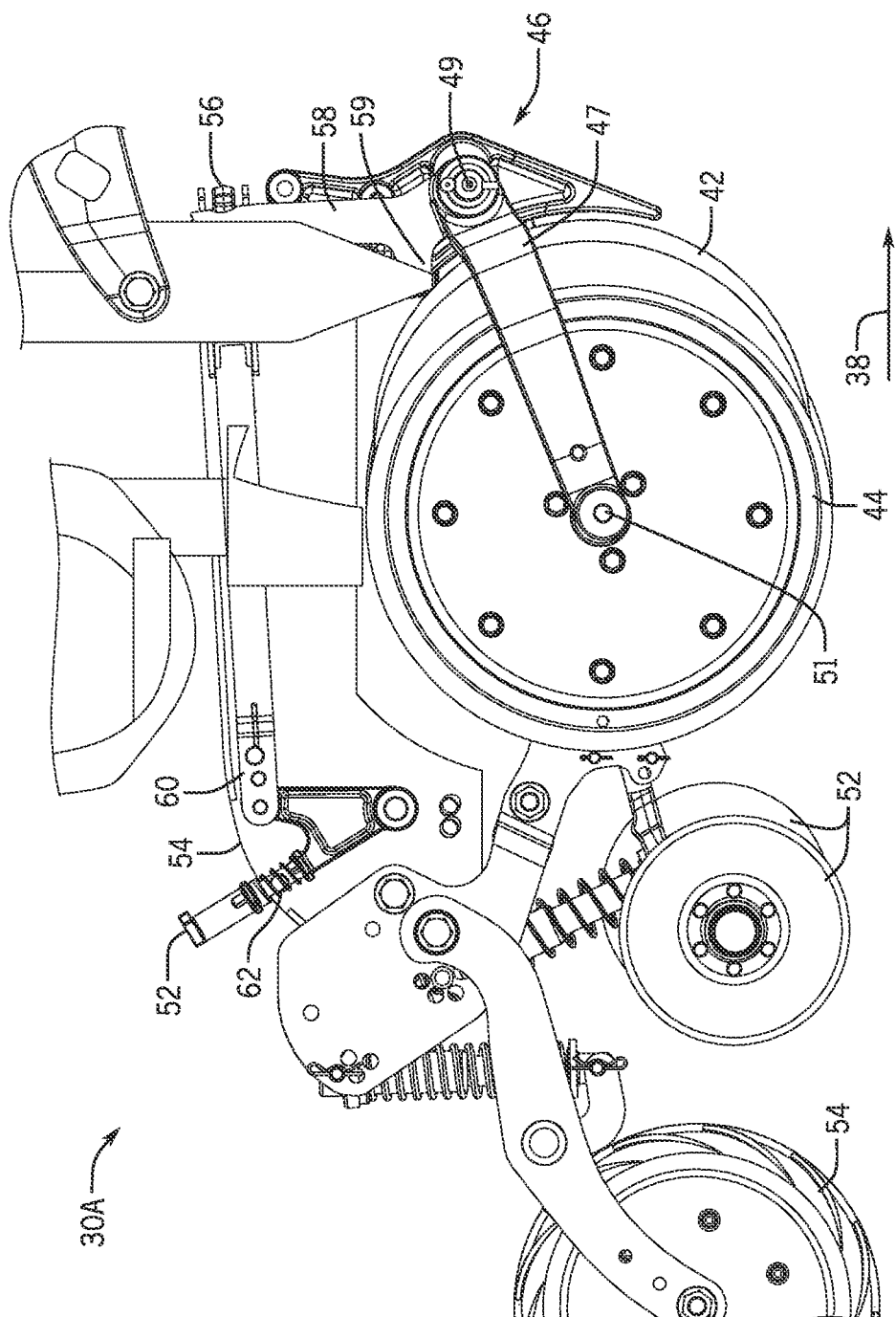
FIG. 3 is a cross-sectional view of the row unit of FIG. 2, including a depth control system for the front pivot gauge wheel assembly.

FIG. 3 is a cross-sectional view of the row unit 30A including a depth control system for the front pivot gauge wheel assembly 46. In the illustrated embodiment, the pivot lever 52 is coupled to a linkage system arm 60. The linkage system arm 60 couples the pivot lever 52 to the linkage system actuator 56. Accordingly, as the pivot lever 52 is moved down and rearward in the peg system 54, the linkage system arm 60 moves in a rearward direction relative to the direction of travel 38, and, consequently, the linkage system actuator 56 also moves in the rearward direction. As discussed above, the rearward movement of the linkage system actuator 56 drives the front pivot actuator 58 to rotate in the first rotational direction, thereby driving the front pivot rocker 59 to rotate in the first rotational direction. In this manner, the front pivot rocker 59 provides a stop to prevent the gauge wheels 44 from moving in an upward direction past a position of the front pivot rocker 59. As a result, a shallower furrow may be formed by the opener discs 42.

For example, the opener discs 42 may be fixed in relation to the frame of the row unit 30A, while a maximum upward position of the gauge wheels 44 is controlled by a position of the pivot lever 52. As the gauge wheels 44 move in a downward direction, the opener discs 42 are positioned to form shallower furrows. Likewise, as the gauge wheels 44 move upwardly, the opener discs 42 are able to form deeper furrows in the ground 22. In essence, according to the illustrated embodiment, as the pivot lever 52 moves downwardly and toward the rear of the row unit 30A, the opener discs 42 form a shallower furrow. In contrast, as the pivot lever 52 moves upwardly and toward the front of the row unit 30A, the opener discs 42 form a deeper furrow.

Additionally, a spring 62 may enable locking and unlocking of the pivot lever 52 within the peg system 54. When a handle of the pivot lever 52 is pushed inward toward the spring 62, the spring 62 compresses, and the pivot lever 52 disengages from a slot of the peg system 54. Upon disengaging from the slot, the pivot lever 52 is free to move up or down to select a desired penetration depth of the opener discs 42. Further, it may be appreciated that each row unit 30A may be liftable to disengage the row unit 30A from the ground 22 prior to moving the pivot lever 52. In this manner, the pivot lever 52 may move between positions within the peg system 54 with greater ease than if the row unit 30A was still in contact with the ground 22.

Figure 4:
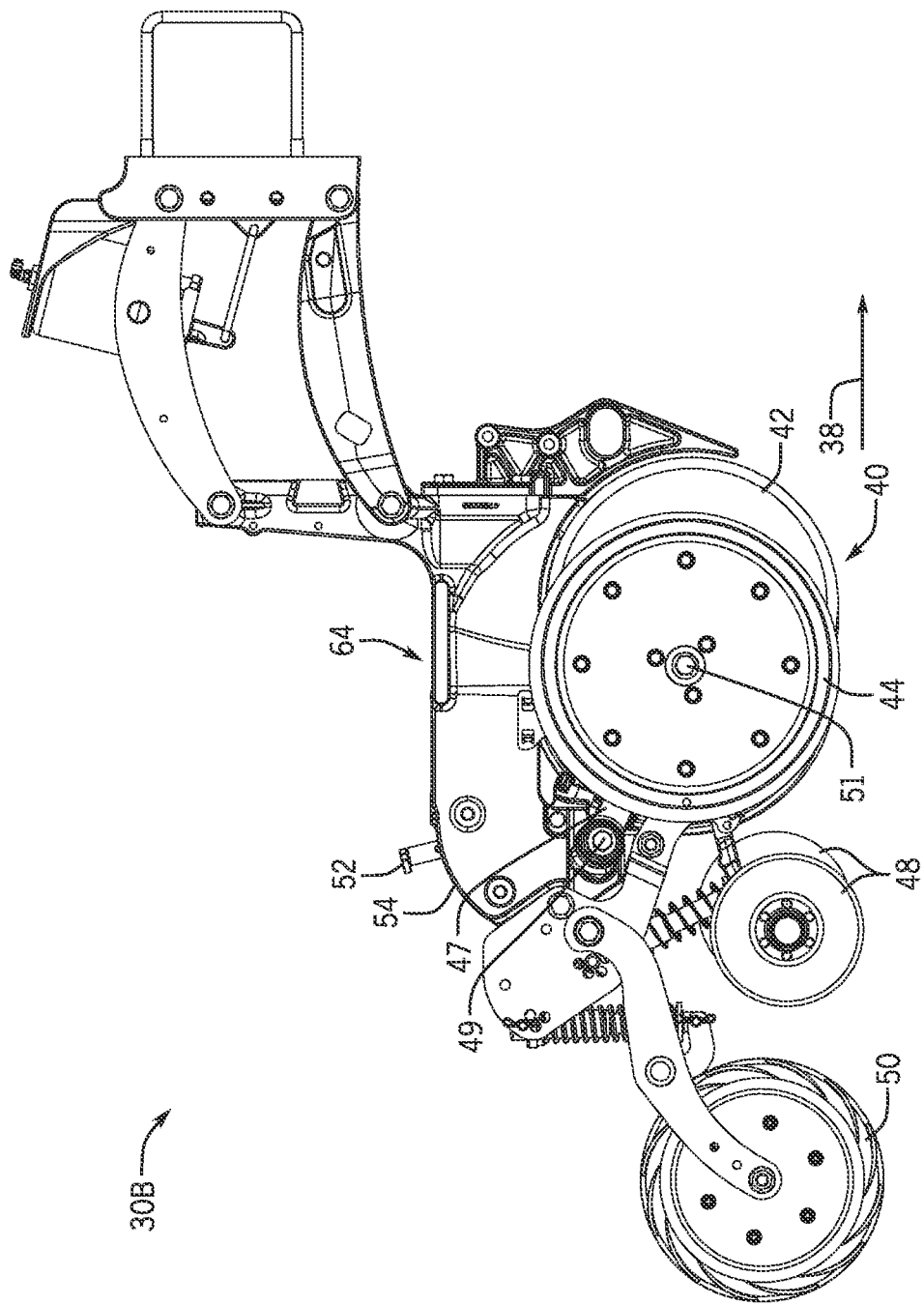
FIG. 4 is a side view of an embodiment of a row unit, which may be mounted to the agricultural implement of FIG. 1, including a rear pivot gauge wheel assembly of the opener assembly.

FIG. 4 is a side view of an embodiment of a row unit 30B, which may be mounted to the agricultural implement 10 of FIG. 1, including a rear pivot gauge wheel assembly 64. As with the front pivot gauge wheel assembly 46 described above, the opener assembly 40 of the illustrated embodiment includes the opener discs 42 and the gauge wheels 44. However, in place of the front pivot gauge wheel assembly 46, the illustrated embodiment includes a rear pivot gauge wheel assembly 64. The rear pivot gauge wheel assembly 64 pushes the gauge wheels 44 relative to the direction of travel 38. Accordingly, the rear pivot gauge wheel assembly 64 includes the gauge wheel pivot 49 behind the axis of rotation 51 of the gauge wheels 44. However, as discussed in detail below, the pivot lever 52 operates in a different manner than the embodiment described above with reference to FIGS. 2-3. For example, the pivot lever 52 may be moved downwardly and toward the rear of the row unit 30B to increase the penetration depth of the opener discs 42, and the pivot lever 52 may be moved upwardly and toward the front of the row unit 30B to decrease the penetration depth of the opener discs 42.

Additionally, the row unit 30B also includes the closing discs 48 and the packing wheel 50 coupled to the frame of the row unit 30B in a manner similar to the configuration of the row unit 30A, as described above. As illustrated, the closing discs 48 are rearwardly disposed from the gauge wheels 44 relative to the direction of travel 38. The closing discs 48 are positioned to direct soil back into the furrow to cover the seeds. Furthermore, a packing wheel 50 follows the closing discs 48 to compact the soil onto the seeds.

Further, to adjust the penetration depth of the opener discs 42, the pivot lever 52 may be moved within the peg system 54 to control the position of the gauge wheels 44 relative to the opener discs 42 in a manner similar to the configuration of the row unit 30A, as described above. Adjusting the pivot lever 52 drives a rear pivot rocker, which is coupled to the pivot lever 52, to move the gauge wheels 44 and/or provide a stop to prevent the gauge wheels 44 from moving further in a particular direction. As the rear pivot rocker is moved downwardly and rearwardly relative to the direction of travel 38, the rear pivot rocker provides a stop that prevents the gauge wheels 44 from moving upwardly, and in some instances may drive the gauge wheels 44 downwardly. Positioning the gauge wheels 44 downwardly reduces the penetration depth of the opener discs 42. Similarly, when the rear pivot rocker moves upwardly and forward relative to the direction of travel 38, the rear pivot rocker enables the pivot arm 47 to rotate in the first direction until the gauge wheels 44 reach the stop provided by the rear pivot rocker, thereby enabling the gauge wheels 44 to move upwardly as the gauge wheels 44 maintain contact with the rear pivot rocker. Accordingly, the opener discs 42 may be driven deeper into the ground 22 for forming the furrow.

Figure 5:
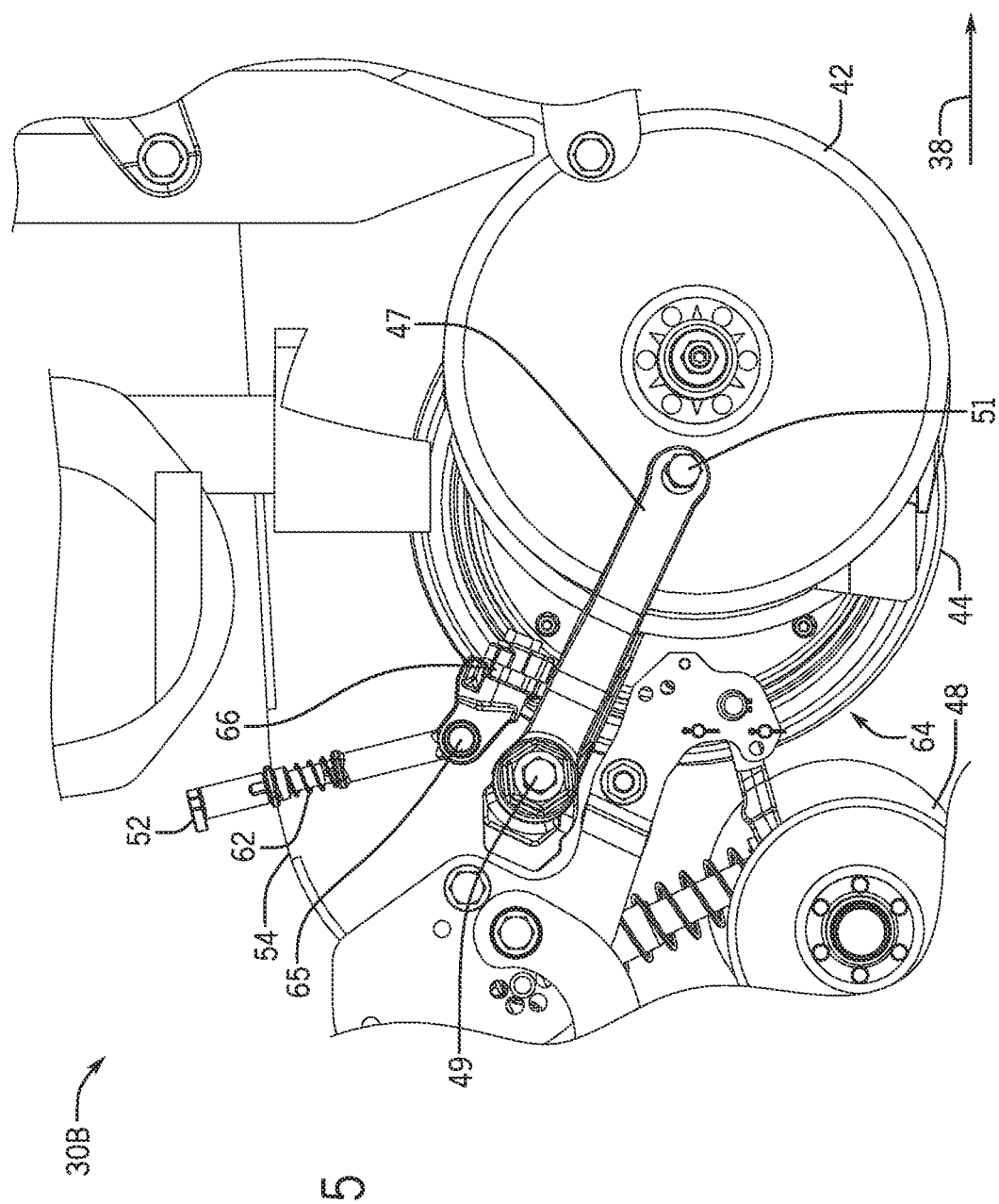
FIG. 5 is a cross-sectional view of the row unit of FIG. 4, including a depth control system for the rear pivot gauge wheel assembly.

FIG. 5 is a cross-section view of an embodiment of the row unit 30B, including the depth control system for the rear pivot gauge wheel assembly 64. In the illustrated embodiment, the pivot lever 52 is coupled to the rear pivot rocker 66 via a pivot 65. The pivot lever 52 and the rear pivot rocker 66 each rotate about the pivot 65 as the pivot lever 52 is moved within the peg system. As discussed above, the rear pivot rocker 66 facilitates adjustment of the depth at which the opener discs 42 penetrate the ground 22. Accordingly, as the pivot lever 52 is moved downwardly and rearwardly in the peg system 54, the rear pivot rocker 66 moves in an upward and forward direction, which enables the gauge wheels 44 to move in an upward direction. While the gauge wheels 44 move in an upward direction or a downward direction relative to the row unit frame, the opener discs 42 maintain a constant position relative to the row unit frame. As discussed above, the movement of the gauge wheels 44 upwardly results in the opener discs 42 penetrating deeper into the ground 22. Additionally, movement of the pivot lever 52 upwardly and forwardly in the peg system 54 results in the rear pivot rocker 66 moving downwardly and rearwardly, which generates a stop that prevents the gauge wheels 44 from moving in an upward direction. Further, the rear pivot rocker 66 may engage with the gauge wheels 44 while moving downwardly and rearwardly, which may also drive the gauge wheels 44 in a downward direction. This downward movement and/or prevention of upward movement of the gauge wheels 44 results in the opener discs 42 penetrating the ground 22 at a shallower depth.

For example, the opener discs 42 may be fixed in relation to the frame of the row unit 30B, while the gauge wheels 44 move based on a position of the pivot lever 52. As the gauge wheels 44 move in a downward direction, the opener discs 42 are positioned to form shallower furrows. Likewise, as the gauge wheels 44 move up, the opener discs 42 are able to form deeper furrows in the ground 22. In essence, according to the illustrated embodiment, as the pivot lever 52 moves downwardly and toward the rear of the row unit 30B, the opener discs 42 form a deeper furrow. In contrast, as the pivot lever 52 moves upwardly and toward the front of the row unit 30B, the opener discs 42 form a shallower furrow.

Additionally, the spring 62 may enable locking and unlocking of the pivot lever 52 within the peg system 54. When a handle of the pivot lever 52 is pushed inward toward the spring 62, the spring 62 compresses, and the pivot lever 52 disengages from a slot of the peg system 54. Upon disengaging from the slot, the pivot lever 52 is free to move up or down to select a desired penetration depth of the opener discs. Further, it may be appreciated that each row unit 30B may be liftable to disengage the row unit 30B from the ground 22 prior to moving the pivot lever 52. In this manner, the pivot lever 52 may move between positions within the peg system 54 with greater ease than if the row unit 30B was still in contact with the ground 22.

Figure 6:
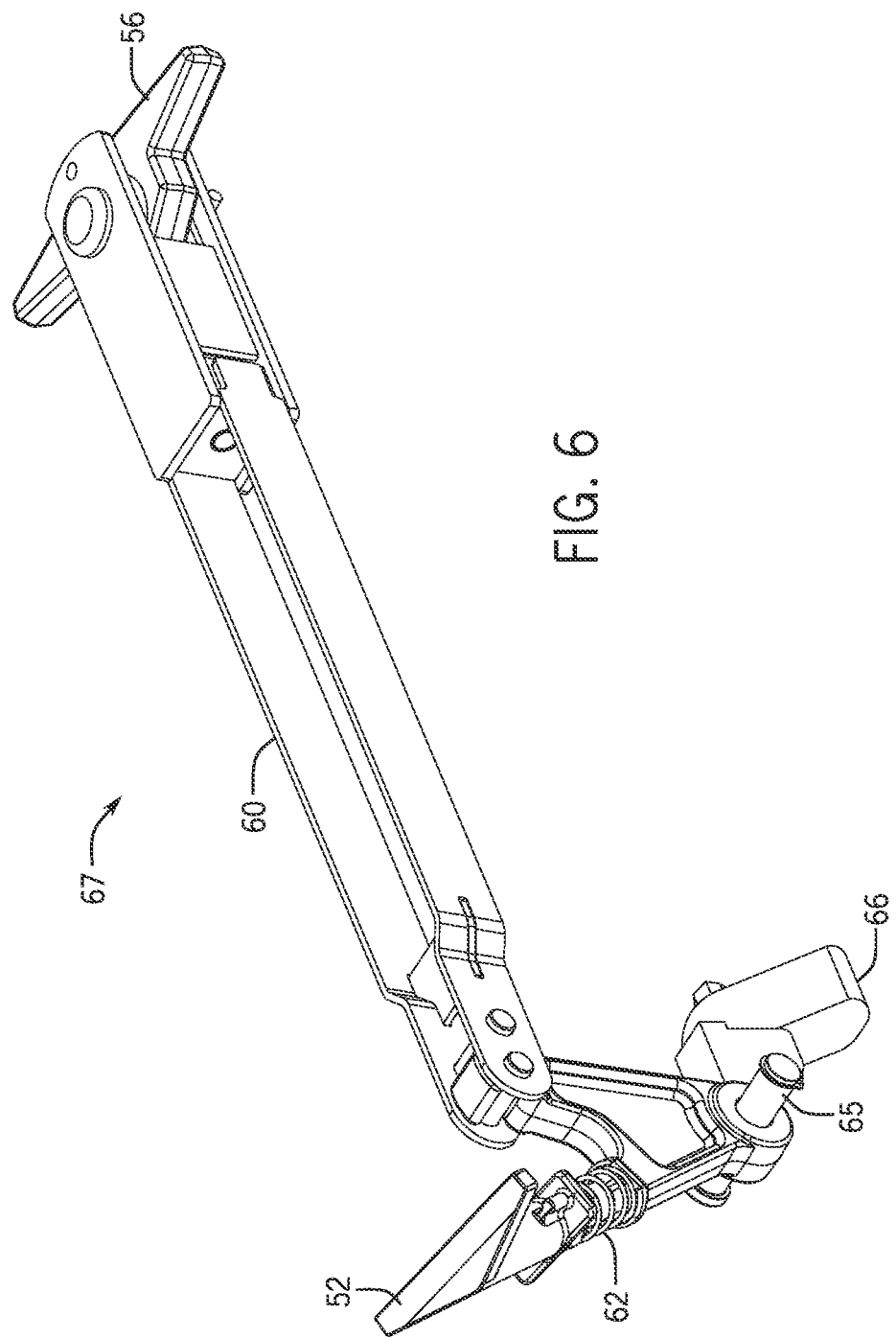
FIG. 6 is a perspective view of the penetration depth control system for the front pivot gauge wheel assembly and the rear pivot gauge wheel assembly.

FIG. 6 is a perspective view of an embodiment of a depth control system 67, including the linkage system arm 60 and the linkage system actuator 56 for the front pivot gauge wheel assembly 46, and the rear pivot rocker 66 and the pivot 65 for the rear pivot gauge wheel assembly 64. The depth control system 67 also includes the spring 62, which enables engagement and disengagement of the pivot lever 52 from a slot of the peg system 54. In certain embodiments, the linkage system arm 60, the rear pivot rocker 66, and the pivot lever 52 are all cast in a common casting operation. That is, parts for both the front pivot gauge wheel assembly 46 and the rear pivot gauge wheel assembly 64 may be manufactured at the same time. In this manner, additional parts specific to a single gauge wheel assembly (e.g., front pivot, rear pivot) are obviated, and the manufacturing process may produce all of the parts used in both the front pivot gauge wheel assembly 46 and the rear pivot gauge wheel assembly 64 at the same time. The pivot lever 52 may operate similarly for the front pivot gauge wheel assembly 46 and for the rear pivot gauge wheel assembly 64. A configuration of the pivot lever 52 is not changed between the front and rear pivot gauge wheel assemblies 46 and 64. Accordingly, the pivot lever 52 may operate with all parts for the front pivot gauge wheel assembly 46 and the rear pivot gauge wheel assembly 64 in either configuration.

Further, certain components of the depth control system 67 may be easily removable. For example, the linkage system arm 60 and the linkage system actuator 56 may be removed from the pivot lever 52 and the rear pivot rocker 66 while the rear pivot gauge wheel assembly 64 is used by the row unit 30B. Conversely, the rear pivot rocker 66 may be removed from the pivot lever 52, the linkage system arm 60, and the linkage system actuator 56 while the front pivot gauge wheel assembly 46 is used by the row unit 30A. Accordingly, an operator of the agricultural implement 10 may readily configure the depth control system 67 for use with either gauge wheel assembly.

Figure 7:
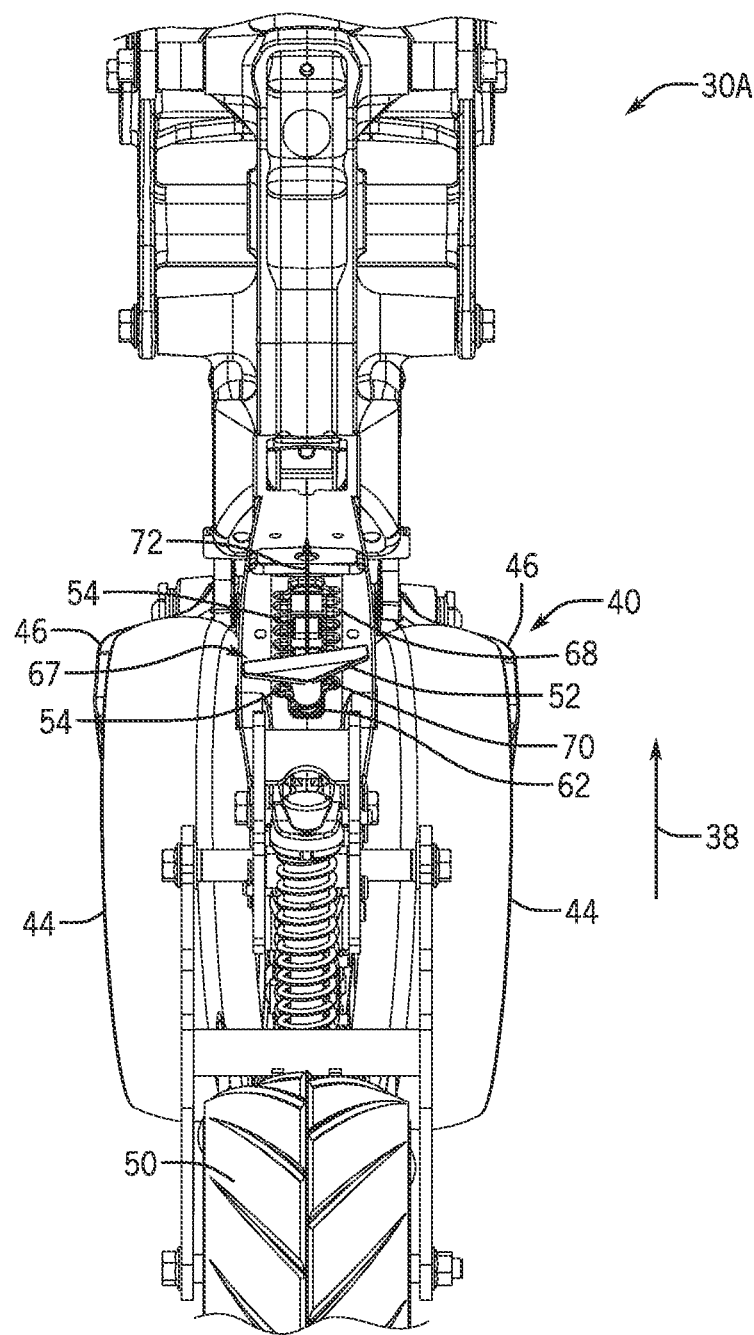
FIG. 7 is a top view of the row unit of FIG. 2, including a pivot lever and a peg system.

FIG. 7 is a top view of the row unit 30A including the pivot lever 52 and the peg system 54. As illustrated, the peg system 54 includes 16 positions/slots 68 corresponding to slots between protrusions positioned on either side of the peg system 54. For example 8 of the positions/slots 68 of the peg system 54 reside on one side of the pivot lever 52, and 8 of the positions/slots 68 of the peg system 54, which are slightly offset from the first 8 positions, reside on the other side of the pivot lever 52. The pivot lever 52 includes pegs 70 deposited on either side of the pivot lever 52, which are configured to engage the positions/slots 68. Because the positions/slots 68 on either side of the pivot lever 52 are staggered, the positions/slots 68 produce 16 different positions in which the pivot lever 52 may reside. Accordingly, the peg system 54 enables 16 different penetration depths for the opener discs 42. Further, the peg system 54 provides a mechanism for the pivot lever 52 and, thus, the gauge wheels 44 to maintain the opener discs 42 at a substantially constant depth in the ground 22. It may be appreciated that while the illustrated peg system 54 includes 16 different depths, the peg system 54 may include more or fewer depth variations depending on a number of the positions/slots 68 included in the peg system 54. For example, each additional position 68 added to either side of the peg system 54 may increase the number of depths available by one.

Additionally, an arrow 72 represents a direction that the pivot lever 52 may travel. For example, because the row unit 30A includes the front pivot gauge wheel assembly 46, the pivot lever 52, as illustrated, is positioned to establish the shallowest penetration depth of the opener discs 42. As the pivot lever 52 travels in the direction of the arrow 72, the penetration depth of the opener discs 42 gradually increases until a maximum penetration depth is reached at the uppermost portion on the peg system 54. That is, as the pivot lever 52 travels in the direction of the arrow 72, the gauge wheels 44 may be driven to move in an upward direction, thereby enabling the opener discs 42 to penetrate the ground 22 at a greater depth.

Further, to enable movement of the pivot lever 52, an operator may apply a force to a top of the pivot lever 52. The force applied to the top of the pivot lever 52 drives the pivot lever 52 toward the ground 22, which disengages the pegs 70 from the positions/slots 68. While the pegs 70 are disengaged from the positions/slots 68, the pivot lever 52 is free to move in the direction of the arrow 72 until a desired penetration depth of the opener discs 42 is reached. Upon reaching the desired penetration depth, the force on the pivot lever 52 is released, and the pegs 70 reengage with the positions/slots 68 due to decompression of the spring 62.

Figure 8:
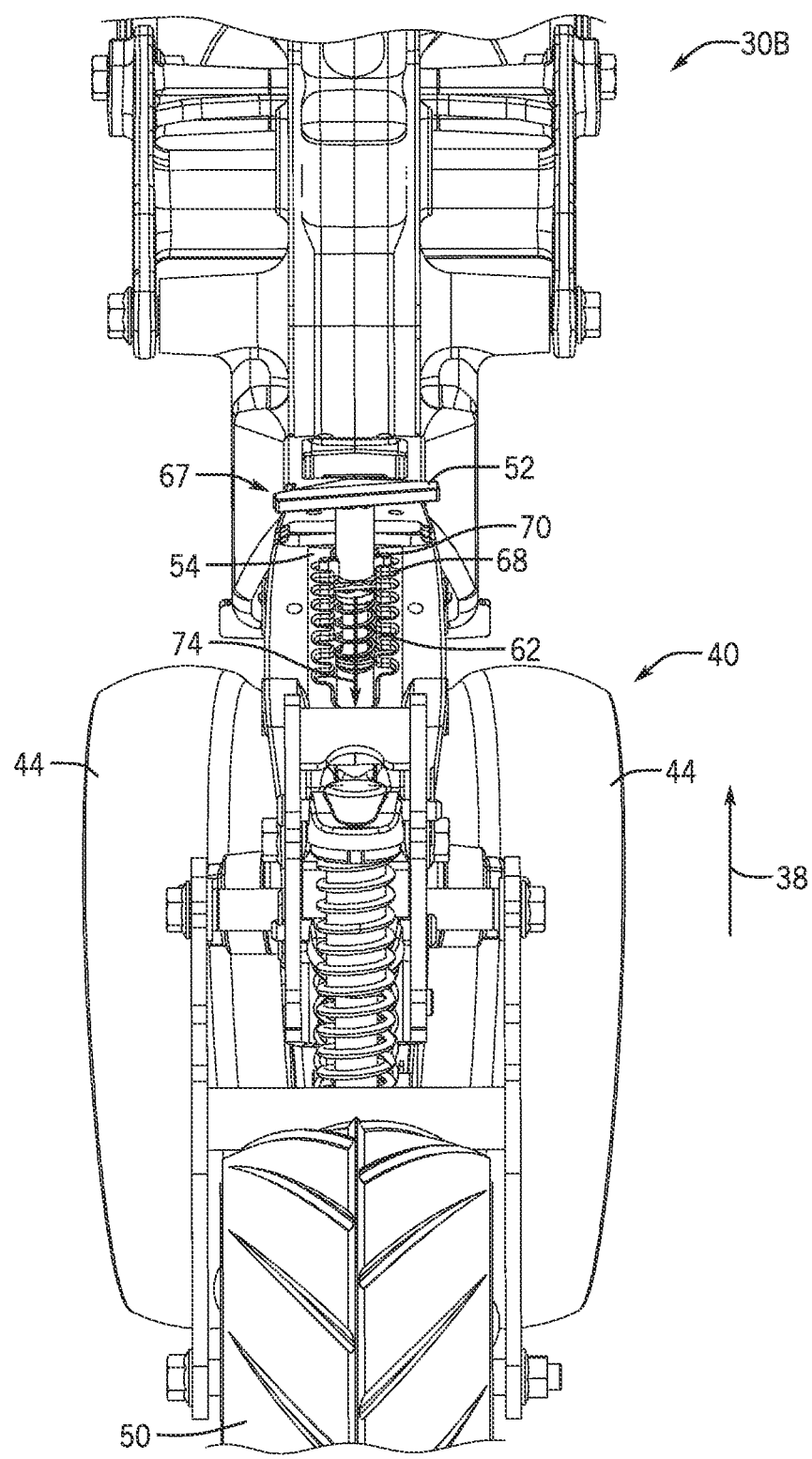
FIG. 8 is a top view of the row unit of FIG. 4, including the pivot lever and the peg system.

FIG. 8 is a top view of the row unit 30B including the pivot lever 52 and the peg system 54. As illustrated, the peg system 54 includes 16 positions/slots 68 corresponding to slots between protrusions positioned on either side of the pivot arm 54. For example 8 of the positions/slots 68 of the peg system 54 reside on one side of the pivot lever 52, and 8 of the positions/slots 68 of the peg system 54, which are slightly offset from the first 8 positions, reside on the other side of the pivot lever 52. The pivot lever 52 includes pegs 70 deposited on either side of the pivot lever 52, which are configured to engage the positions/slots 68. Because the positions/slots 68 on either side of the pivot lever 52 are staggered, the positions/slots 68 produce 16 different configurations in which the pivot lever 52 may reside. Accordingly, the peg system 54 enables 16 different penetration depths for the opener discs 42. Further, the peg system 54 provides a mechanism for the pivot lever 52 and, thus, the gauge wheels 44 to maintain the opener discs 42 at a substantially constant depth in the ground 22.

Additionally, in contrast to the row unit 30A of FIG. 7, an arrow 74 represents a direction that the pivot lever 52 may travel. For example, because the row unit 30B includes the rear pivot gauge wheel assembly 64, the pivot lever 52, as illustrated, is positioned to establish the shallowest position of the opener discs 42. As the pivot lever 52 travels in the direction of the arrow 74, the penetration depth of the opener discs 42 gradually increases until a maximum penetration depth is reached at the lowermost portion on the peg system 54. That is, as the pivot lever 52 travels in the direction of the arrow 74, the gauge wheels 44 may be driven to move in an upward direction, thereby enabling the opener discs 42 to penetrate the ground 22 at a greater depth.

Further, to enable movement of the pivot lever 52, an operator may apply a force to a top of the pivot lever 52. The force applied to the top of the pivot lever 52 drives the pivot lever 52 toward the ground 22, which disengages the pegs 70 from the positions/slots 68. While the pegs 70 are disengaged from the positions/slots 68, the pivot lever 52 is free to move in the direction of the arrow 74 until a desired penetration depth of the opener discs 42 is reached. Upon reaching the desired penetration depth, the force on the pivot lever 52 is released, and the pegs 70 reengage with the positions/slots 68 due to decompression of the spring 62.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An agricultural implement, comprising:
   a frame configured to selectively couple to a front pivot gauge wheel assembly and a rear pivot gauge wheel assembly;
   a depth control system comprising:
     a single pivot lever directly rotatably coupled to the frame;
     a depth controller mounted to the single pivot lever, wherein the depth controller is configured to selectively interact with the front pivot gauge wheel assembly and the rear pivot gauge wheel assembly, and the rear pivot gauge wheel assembly and the front pivot gauge wheel assembly are each configured to selectively couple to the frame on opposing sides of an axis of rotation of a gauge wheel;
   wherein the depth control system is configured to control a height of the gauge wheel relative to the frame via movement of the single pivot lever while the front pivot gauge wheel assembly is coupled to the frame and the depth controller is configured to interact with the front pivot gauge wheel assembly, and the depth control system is configured to control the height of the gauge wheel relative to the frame via movement of the single pivot lever while the rear pivot gauge wheel assembly is coupled to the frame and the depth controller is configured to interact with the rear pivot gauge wheel assembly.

2. The agricultural implement of claim 1, comprising a rear pivot rocker while the single pivot lever is coupled to the rear pivot gauge wheel assembly.

3. The agricultural implement of claim 2, wherein the rear pivot rocker is configured to interact with the gauge wheel.

4. The agricultural implement of claim 1, comprising a linkage system while the single pivot lever is coupled to the front pivot gauge wheel assembly.

5. The agricultural implement of claim 4, wherein the linkage system comprises a linkage system actuator and the linkage system actuator is configured to interact with a front pivot actuator to control the height of the gauge wheel relative to the frame.

6. The agricultural implement of claim 1, wherein moving the single pivot lever in a first direction results in increasing the height of the gauge wheel relative to the frame while the depth controller interacts with the front pivot gauge wheel assembly, and moving the single pivot lever in the first direction results in decreasing the height of the gauge wheel relative to the frame while the depth controller interacts with the rear pivot gauge wheel assembly.

7. The agricultural implement of claim 1, comprising a peg system and a spring, wherein the spring is configured to engage the single pivot lever with the peg system.

8. The agricultural implement of claim 1, wherein the depth controller comprises both a rear pivot rocker and a linkage system.

9. The agricultural implement of claim 8, wherein the rear pivot rocker and the linkage system are each independently removable from the depth controller.

10. The agricultural implement of claim 1, wherein at least one opener disc coupled to the frame of the agricultural implement remains stationary relative to the frame of the agricultural implement while the gauge wheel is movable relative to the frame of the agricultural implement.

11. A system for positioning a gauge wheel of an agricultural implement, comprising:
    the gauge wheel pivotally coupled to a frame of the agricultural implement; and
    a depth control system mounted on the frame of the agricultural implement, wherein the depth control system comprises:
      a single pivot lever directly rotatably coupled to the frame of the agricultural implement; and
      a depth controller comprising a rear pivot rocker, a linkage system, or a combination thereof, mounted to the single pivot lever, wherein the depth controller is configured to selectively interact with a rear pivot gauge wheel assembly and a front pivot gauge wheel assembly, the rear pivot gauge wheel assembly and the front pivot gauge wheel assembly are configured to selectively couple to the frame on opposing sides of an axis of rotation of the gauge wheel, the rear pivot rocker is configured to selectively interact with the rear pivot gauge wheel assembly to control a first height of the gauge wheel based on a position of the single pivot lever while the depth controller comprises the rear pivot rocker and the gauge wheel is coupled to the rear pivot gauge wheel assembly, and the linkage system is configured to selectively interact with the front pivot gauge wheel assembly to control a second height of the gauge wheel based on the position of the single pivot lever while the depth controller comprises the linkage system and the gauge wheel is coupled to the front pivot gauge wheel assembly.

12. The system of claim 11, wherein the front pivot gauge wheel assembly comprises a gauge wheel pivot in front of the axis of rotation of the gauge wheel.

13. The system of claim 11, wherein the rear pivot gauge wheel assembly comprises a gauge wheel pivot behind the axis of rotation of the gauge wheel.

14. The system of claim 11, comprising a peg system configured to receive the single pivot lever and to maintain the single pivot lever in a depth position.

15. The system of claim 14, wherein the single pivot lever maintains engagement with the peg system via a spring.

16. The system of claim 11, wherein the single pivot lever is disposed behind the gauge wheel, relative to a direction of travel of the agricultural implement.

17. A depth control system for an agricultural implement, comprising:
    a single pivot lever directly rotatably coupled to a frame of the agricultural implement;
    a rocker coupled to the single pivot lever; and a linkage system coupled to the single pivot lever comprising a linkage system actuator and a linkage system arm;

wherein the rocker and the linkage system are each removable from the single pivot lever, the single pivot lever is configured to pivot to control the rocker and the linkage system, the rocker is configured to selectively interact with a rear pivot gauge wheel assembly to control a depth at which an opener disc generates a furrow while the rocker is coupled to the single pivot lever and the rear pivot gauge wheel assembly is coupled to the frame of the agricultural implement, and the linkage system is configured to selectively interact with a front pivot gauge wheel assembly to control a depth at which the opener disc generates the furrow while the linkage system is coupled to the single pivot lever and the front pivot gauge wheel assembly is coupled to the frame of the agricultural implement, wherein the rear pivot gauge wheel assembly and the front pivot gauge wheel assembly are configured to selectively couple to the frame on opposing sides of an axis of rotation of a gauge wheel.

18. The depth control system of claim 17, comprising a peg system and a spring, wherein the spring is configured to engage the pivot lever with the peg system.

19. The depth control system of claim 17, wherein the front pivot gauge wheel assembly comprises the gauge wheel and a gauge wheel pivot disposed in front of the axis of rotation of the gauge wheel.

20. The depth control system of claim 17, wherein the rear pivot gauge wheel assembly comprises the gauge wheel and a gauge wheel pivot disposed behind the axis of rotation of the gauge wheel.

* * * * *